(12) United States Patent
Fukushima et al.

(10) Patent No.: US 10,389,072 B2
(45) Date of Patent: Aug. 20, 2019

(54) CONNECTION MODULE (71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Naoki Fukushima, Mie (JP); Osamu Nakayama, Mie (JP); Katsushi Miyazaki, Mie (JP); Seishi Kimura, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 16/041,241

(22) Filed: Jul. 20, 2018

(65) Prior Publication Data

US 2019/0052035 A1 Feb. 14, 2019

(30) Foreign Application Priority Data

Aug. 9, 2017 (JP) ................................. 2017-154127

(51) Int. Cl.
*H01M 2/26* (2006.01)
*H01R 25/16* (2006.01)
(Continued)

(52) U.S. Cl.
CPC .......... *H01R 25/165* (2013.01); *H01M 2/202* (2013.01); *H01M 2/30* (2013.01);
(Continued)

(58) Field of Classification Search
CPC ...... H01M 2/202; H01M 2/206; H01R 43/16; H01R 13/447; H01R 25/16
(Continued)

(56) References Cited

U.S. PATENT DOCUMENTS 8,999,552 B2* 4/2015 Ogasawara ............ H01R 9/226
429/121
9,065,125 B2* 6/2015 Ogasawara ........... H01M 2/206
(Continued)

FOREIGN PATENT DOCUMENTS

JP 2014-127229 7/2014

*Primary Examiner* — Hien D Vu
(74) *Attorney, Agent, or Firm* — Greenblum & Bernstein, P.L.C.

(57) ABSTRACT

A connection module includes a busbar holding module including insulating protectors and an external connection busbar holder disposed above the busbar holding module. The insulating protectors include fixing portions joined to fixed portions provided in the power storage elements or another member to secure the external connection busbar holder. The external connection busbar holder includes a first external connection busbar and a second external connection busbar to which external connection members are bolted and engaging portions that engage with the fixing portions. Each of the fixing portions includes a fixing-reinforcement portion that is displaced to fill the clearance between the fixing portion and the fixed portion in response to engagement with the engaging portion.

5 Claims, 10 Drawing Sheets

(51) Int. Cl.
*H01R 13/621* (2006.01)
*H01M 2/30* (2006.01)
*H01M 2/20* (2006.01)
*H01R 13/514* (2006.01)
*H01R 4/34* (2006.01)

(52) U.S. Cl.
CPC ............ *H01R 4/34* (2013.01); *H01R 13/514* (2013.01); *H01R 13/6215* (2013.01)

(58) Field of Classification Search
USPC .................... 429/121, 122; 439/712, 627
See application file for complete search history.

(56) References Cited

U.S. PATENT DOCUMENTS

| 9,209,550 | B2* | 12/2015 | Kinoshita | ............ H01M 2/206 |
| 9,502,706 | B2* | 11/2016 | Ishibashi | ............... H01M 2/206 |
| 2016/0197330 | A1 | 7/2016 | Takase et al. | |

* cited by examiner

CONNECTION MODULE

TECHNICAL FIELD

The technique disclosed in the present specification relates to a connection module, and particularly to a connection module that has an external connection busbar holder that holds an external connection busbar that is connected to a pair of output electrode terminals that are for supplying power from a group of power storage elements externally.

BACKGROUND ART

Conventionally, external connection busbars that are connected to the output electrode terminals of a group of power storage elements have been known, such as that described in JP 2014-127229A. This reference discloses a battery module (power storage module) M1 in which two electrode terminals of the power storage elements at both ends of a power storage element group serve as a pair of output electrode terminals. The battery module M1 also includes external connection busbars 19B connected to the aforementioned electrode terminals of the power storage elements at both ends. The external connection busbars 19B as well as busbars 19 that are connected to the electrode terminals of the power storage elements are protected by a resin protector 20.

JP 2014-127229A is an example of related art.

However, if the arrangement of a plurality of power storage elements of the group of power storage elements is the same as that disclosed in JP 2014-127229A, that is, if the power storage elements that have a thin rectangular solid shape are arranged in a thickness direction, when a power storage module in which a group of power storage elements are arranged in the same manner as disclosed in the above-identified reference, that is, if the power storage elements in a shape of a thin rectangular solid are arranged in the direction of their width, power may be supplied to an external device from the same end of the power storage element group to an external device via the external connection busbars. In this case, one of the external connection busbars connected to one of the paired pair of output electrode terminals needs to be routed over a long distance to the other end of the power storage element group. This means that this arrangement requires an elongated external connection busbar and a holder member that supports the elongated external connection busbar.

Additionally, an external connection member such as an external device connection busbar for enabling connection to an external device powered by the power storage element group is often bolted to each of the external connection busbars. In order to absorb product variations, predetermined clearances (gaps) are often provided between the external connection busbar holder member and the locking members for locking the holder member. In this case, when the external connection member is bolted to an external connection busbar that is connected to the other one of the output electrode terminals, the aforementioned clearances may allow rattling (displacement) in the holder member. In other words, the clearances make it more likely that the rotation of the bolts will generate a torque load, and the generated torque load will act on the connections between the external connection busbars and the output electrode terminals via the holder member. Such a torque load may affect the reliability of the connection between the external connection busbars and the output electrode terminals of the power storage element group.

SUMMARY OF THE INVENTION

The technical matter disclosed herein has been developed in view of the above-described circumstances, and it is an object of the present invention to provide a connection module that can maintain the reliability of the connection between external connection busbars bolted to external connection members and output terminals of a group of power storage elements.

There is disclosed herein a connection module to be mounted on a group of power storage elements each having positive and negative electrode terminals, the group of power storage elements including a first output electrode terminal for outputting electrical power of one polarity and a second output electrode terminal for outputting electrical power of the other polarity. The connection module includes: a busbar holding module including a plurality of busbars that each connect the positive electrode terminal and the negative electrode terminal of adjacent power storage elements and insulating protectors that hold the plurality of busbars; and an external connection busbar holder disposed above the busbar holding module. The insulating protectors include fixing portions joined to fixed portions provided in the power storage elements or another member fixed to the power storage elements, so as to fix the external connection busbar holder. The external connection busbar holder includes a first external connection busbar having one end and another end, the one end being electrically connected to the first output electrode terminal and an external connection member being bolted to the other end, a second external connection busbar having one end and another end, the one end being electrically connected to the second output electrode terminal and an external connection member being bolted to the other end, and engaging portions that engage with the fixing portions, wherein each of the fixing portions includes a fixing-reinforcement portion that is displaced to fill a clearance between the fixing portion and the fixed portion in response to engagement with the engaging portion.

According to this configuration, in which an external connection member is bolted to the other end of each of the first and second external connection busbars, the fixing portions, provided on the insulating protectors, each include a fixing-reinforcement portion that is displaced to fill a clearance between the fixing portion and the fixed portion in response to the engagement of the engaging portion provided on the external connection busbar holder. Accordingly, even if a torque load is generated as the external connection members are bolted to the other ends of the first and second external connection busbars, the external connection busbar holder is suppressed from moving due to a rotational force caused by the torque load, the movement being allowed by the clearance between the fixing portion and the fixing groove. Thus, the torque load is suppressed from affecting the first external connection busbar and the second external connection busbar via the external connection busbar holder. As a result, the reliability of the connection between the external connection busbars, which are bolted to the external connection members, and the output electrode terminals of the power storage elements can be maintained.

As used herein, the term "displacement of the fixing-reinforcement portions" encompasses deformation and movement the fixing-reinforcement portions. Moreover, the term "being electrically connected" encompasses direct connection between the external connection busbars and the output electrode terminals and indirect connection between the external connection busbars and the output electrode terminals via sub-busbars or the like.

In one aspect, the connection module may be configured such that each of the engaging portions is formed by a protrusion extending downward from a bottom of the external connection busbar holder, each of the fixing portions includes a main body and a fitting portion into which one of the protrusions fits, and each of the fixing-reinforcement portions is formed by a projecting portion that projects upward from a bottom of the main body to form the fitting portion.

According this configuration, the fixing portions for fixing the external connection busbar holder, the engaging portions of the external connection busbar holder that engage with the fixing portions, and the fixing-reinforcement portions of the fixing portions can be provided as simple configurations.

In another aspect, the connection module may be configured such that each of the fitting portions is formed by a fitting groove provided between the main body of the fixing portion and the projecting portion, each of the protrusions has a plate-like shape that fits into one of the fitting grooves, and each of the projecting portions has a thin plate-like shape and is formed upwardly expanding the width of the fitting groove as seen in a side view.

According to this configuration, the fitting portions of the fixing portions and the projecting portions can be provided as simple configurations.

In another aspect, the connection module may be configured such that the external connection busbar holder includes: a first protector portion that holds the one end of the first external connection busbar; and a second protector portion that holds the other end of the first external connection busbar on one end thereof located in a direction perpendicular to a direction in which the power storage elements are aligned, the second protector portion further holding the second external connection busbar on the other end thereof located in the perpendicular direction, and the engaging portions are provided in the second protector portion.

According to this configuration, in which the external connection member is bolted to the other end of the second external connection busbar held by the second protector portion, the engaging portions of the second protector portion engage with the fixing portions of the busbar holding module. Accordingly, even if a torque load is generated as the external connection member are bolted to the other ends of the second external connection busbar, the second protector portion is suppressed from moving due to a rotational force caused by the torque load. Thus, the torque load is suppressed from affecting the first external connection busbar and the second external connection busbar via the second protector portion.

In still another aspect, the connection module may be configured such that the external connection busbar holder includes an intermediate protector portion that holds the first external connection busbar. The first protector portion, the second protector portion, and the intermediate protector portion may be separate members, and the external connection busbar holder may be integrated by joining the first protector portion and the second protector portion with the intermediate protector portion.

According to this configuration, the first protector portion, the second protector portion, and the intermediate protector portion are provided as separate members. This makes it possible to allow for power storage element groups that have different numbers of power storage elements simply by changing the length of the intermediate protector portion, without changing the design of the first protector portion and the second protector portion.

Effect of the Invention

According to the connection module disclosed in the present specification, the reliability of the connection between the external connection busbars, which are bolted to the external connection members, and the output electrode terminals of the power storage elements can be maintained.

EMBODIMENTS OF THE INVENTION

Figure 1:
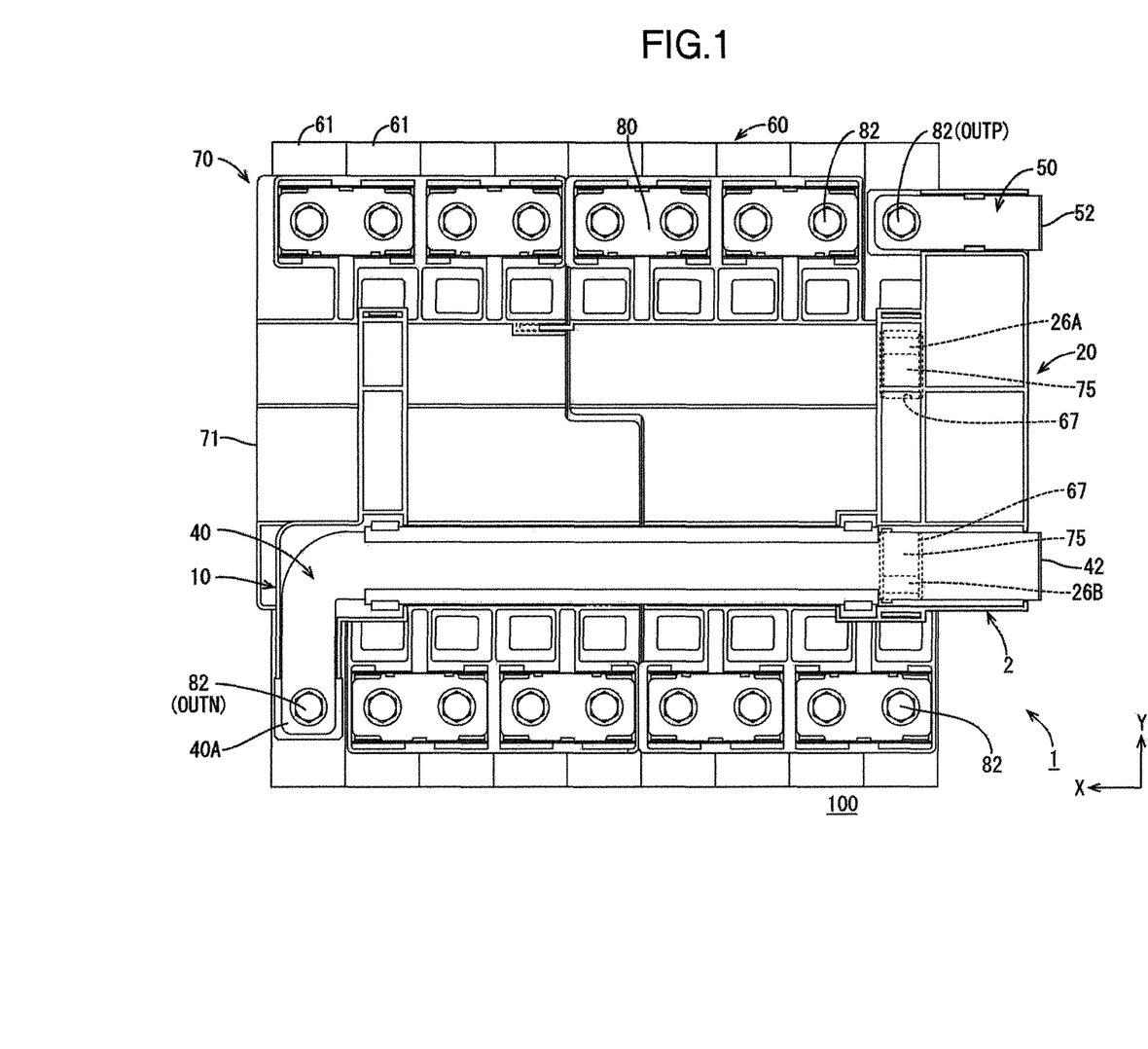
FIG. 1 is a plan view of a power storage module according to one embodiment of the present invention.
Figure 2:
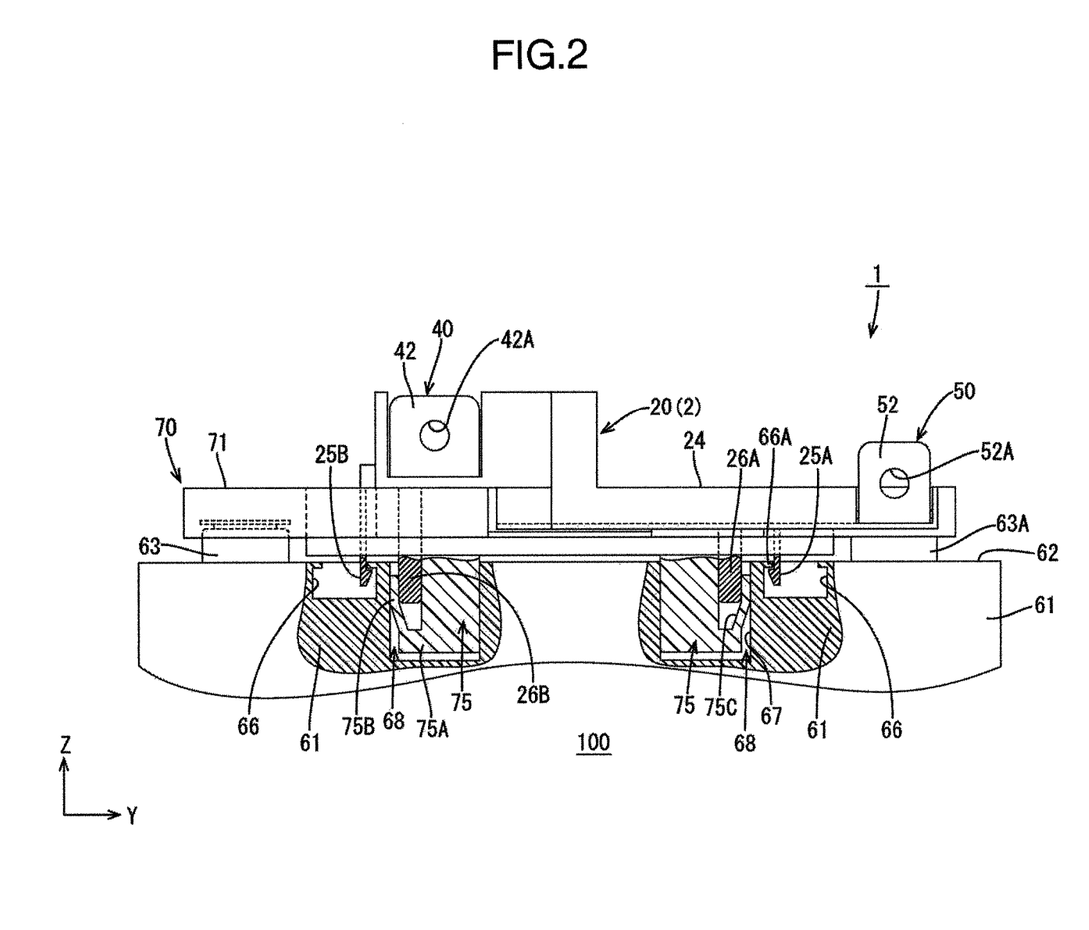
FIG. 2 is a side view of the power storage module.
Figure 3:
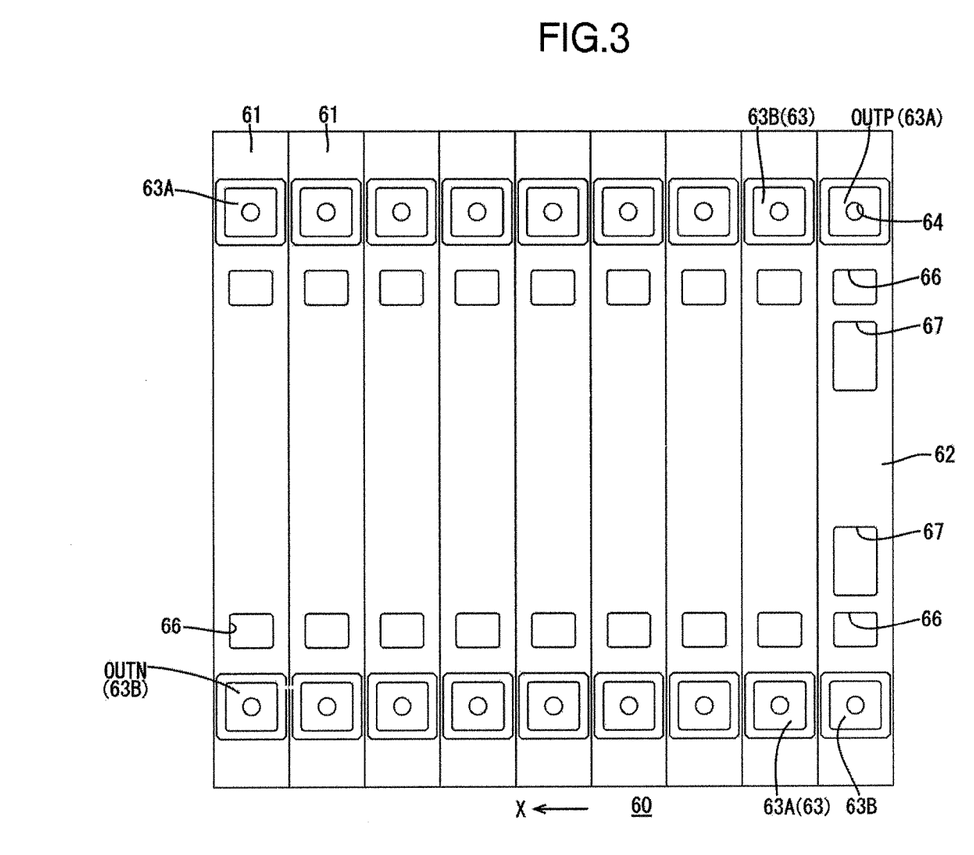
FIG. 3 is a plan view of a group of power storage elements.
Figure 10:
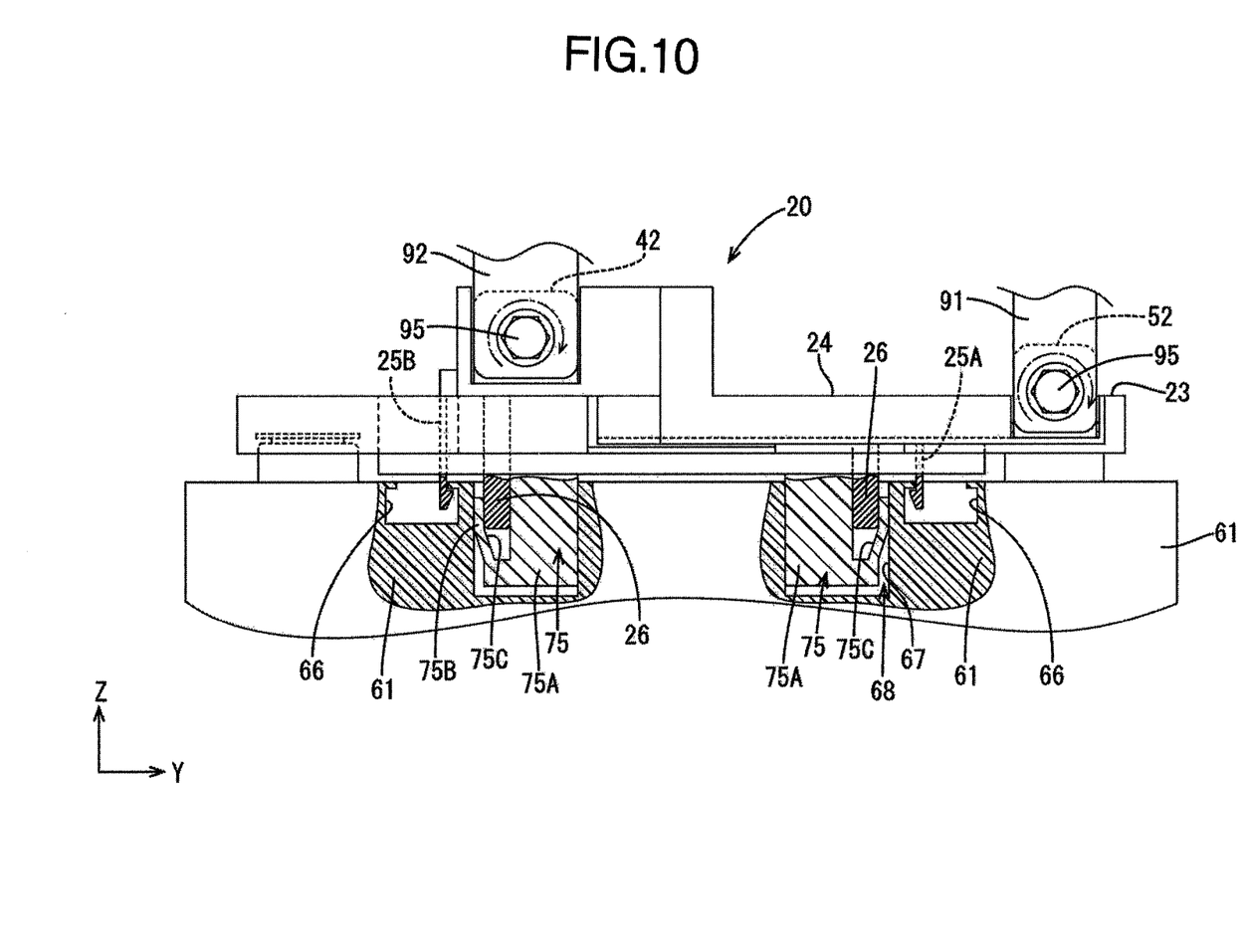
FIG. 10 is a side view showing the external device connection busbars bolted to the power storage module.

An embodiment of the present invention will be described hereinafter with reference to FIGS. 1 to 10. It should be noted that FIGS. 2 and 10 are partial cross-sectional side views. In the following description, the direction indicated by the arrow X in FIGS. 1 and 3 is referred to as the left direction, the direction indicated by the arrow Y in FIG. 1 is referred as the widthwise direction, and the direction indicated by the arrow Z in FIG. 2 is referred to as the upward direction. Where there is a plurality of identical members, one of the identical members may be indicated by a reference symbol while such indication may be omitted for the remaining members.

This embodiment provides a power storage module 100 to be mounted on a vehicle (not shown), such as an electric or hybrid automobile, as the power source to provide a driving force to the vehicle.

1. Structure of Power Storage Module

As shown in FIGS. 1 and 2, the power storage module 100 of this embodiment is largely composed of a power storage element group 60 formed by aligning a plurality (nine in this embodiment) of power storage elements 61 and a connection module 1 mounted on the power storage element group 60 (also referred to as the power storage element group 60). A brief description of the power storage element group 60 will be given hereinafter.

1-1. Group of Power Storage Elements

The power storage elements 61 of this embodiment are secondary batteries, for example. As shown in FIG. 3, the power storage element group 60 is formed by aligning a plurality of power storage elements 61 in a row.

Figure 4:
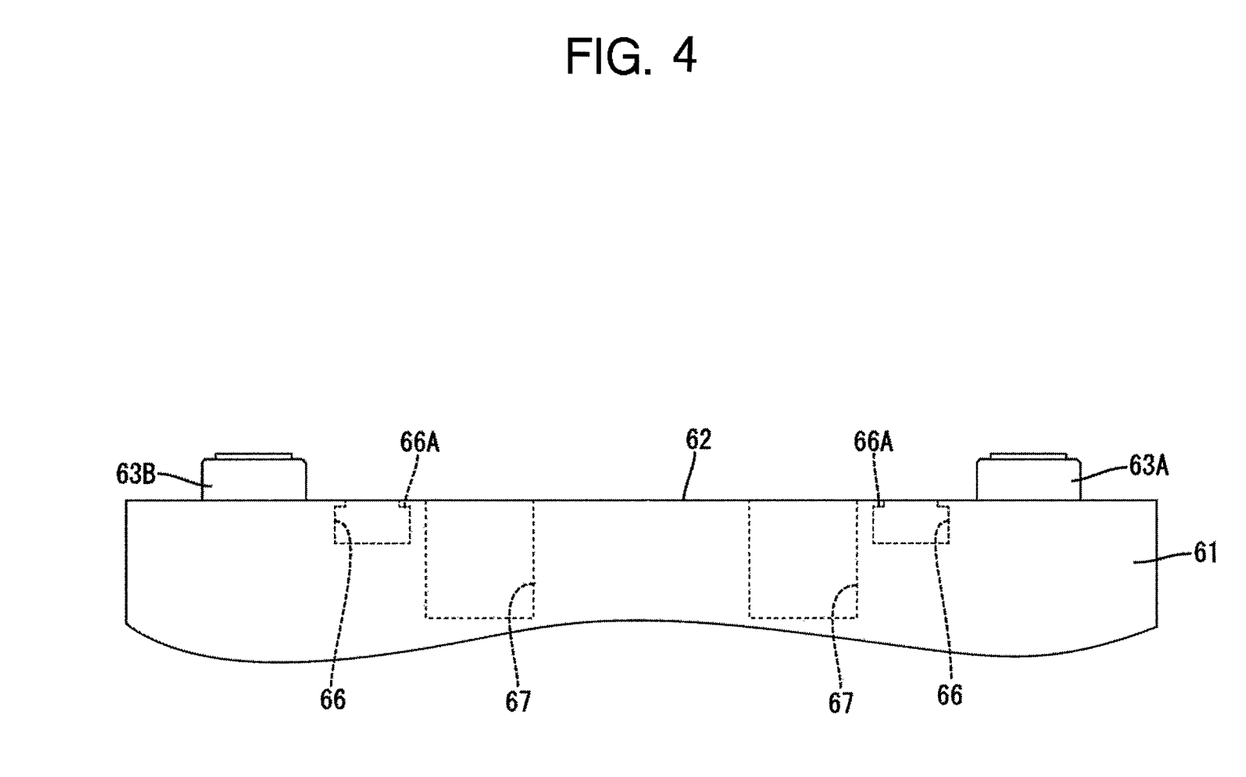
FIG. 4 is a side view of the group of power storage elements.

Each of the power storage elements 61 has a flat rectangular solid shape, and, as shown in FIG. 3, also has an electrode mounting surface 62 perpendicular to the surfaces thereof that oppose an adjacent power storage element 61. A pair of electrode terminals 63 is disposed at positions on the electrode mounting surface 62 that are close to the longitudinal ends thereof. One of the electrode terminals 63 is a positive electrode terminal 63A and the other is a negative electrode terminal 63B. Each of the electrode terminals 63 is made of metal and is in the shape of a square tube that protrudes from the electrode mounting surface 62 (see FIG. 4). A bolt hole 64 to which a bolt 82 (see FIG. 1) is coupled is provided in each electrode terminal 63.

Regions near each of the pair of electrode terminals 63 on the electrode mounting surface 62 of each power storage element 61 are provided with a pair of locking grooves 66 that are to engage with a locking piece 15 of a first protector portion 10 and locking pieces 25A and 25B of a second protector portion 20 (both protector portions 10 and 20 will be described in further details below). Each of the locking grooves 66 has a rectangular opening and is a depression depressed from the electrode mounting surface 62 (see FIGS. 2 and 3). Each locking groove 66 includes an engaging portion 66A that can engage with one of the locking pieces 15, 25A, and 25B (see FIG. 2). As a result of the locking pieces 15, 25A, and 25B engaging with the engaging portions 66A, the external connection busbar holder 2 is mounted on the power storage element group 60.

Also, as shown in FIG. 3, the rightmost power storage element 61 has a pair of fixing grooves 67 formed in the electrode mounting surface 62, near the pair of locking grooves 66, with each fixing groove 67 located on the side of the nearby locking groove 66 that is opposite to the electrode terminal 63 side. A fixing portion 75 of an insulating protector 71A, to be described in detail below, is inserted into each fixing groove 67. Each of the fixing grooves 67 has a rectangular opening and is a depression depressed from the electrode mounting surface 62 (see FIGS. 2 and 3). With the fixing portions 75 of the insulating protector 71A inserted into the fixing grooves 67 and fixed by the fixing grooves 67, the insulating protector 71A, in other words, the external connection busbar holder 2, is fixed above the power storage element group 60.

The plurality of power storage elements 61 are aligned so that electrode terminals 63 of different polarities are placed adjacent to each other on any two adjacent power storage elements 61 (that is, the positive electrode terminal 63A of one power storage element 61 is placed adjacent to the negative electrode terminal 63B of another power storage element 61). As shown in FIG. 3, according to this embodiment, the negative electrode terminal 63B of the leftmost power storage element 61 is a negative output terminal OUTN and the positive electrode terminal 63A of the rightmost power storage element 61 is a positive output terminal OUTP.

2. Connection Module

As shown in FIG. 1, the connection module 1 includes a busbar holding module 70 and the external connection busbar holder 2 and is mounted onto the power storage element group 60 (see FIG. 2).

2-1. Structure of Busbar Holding Module

Figure 5:
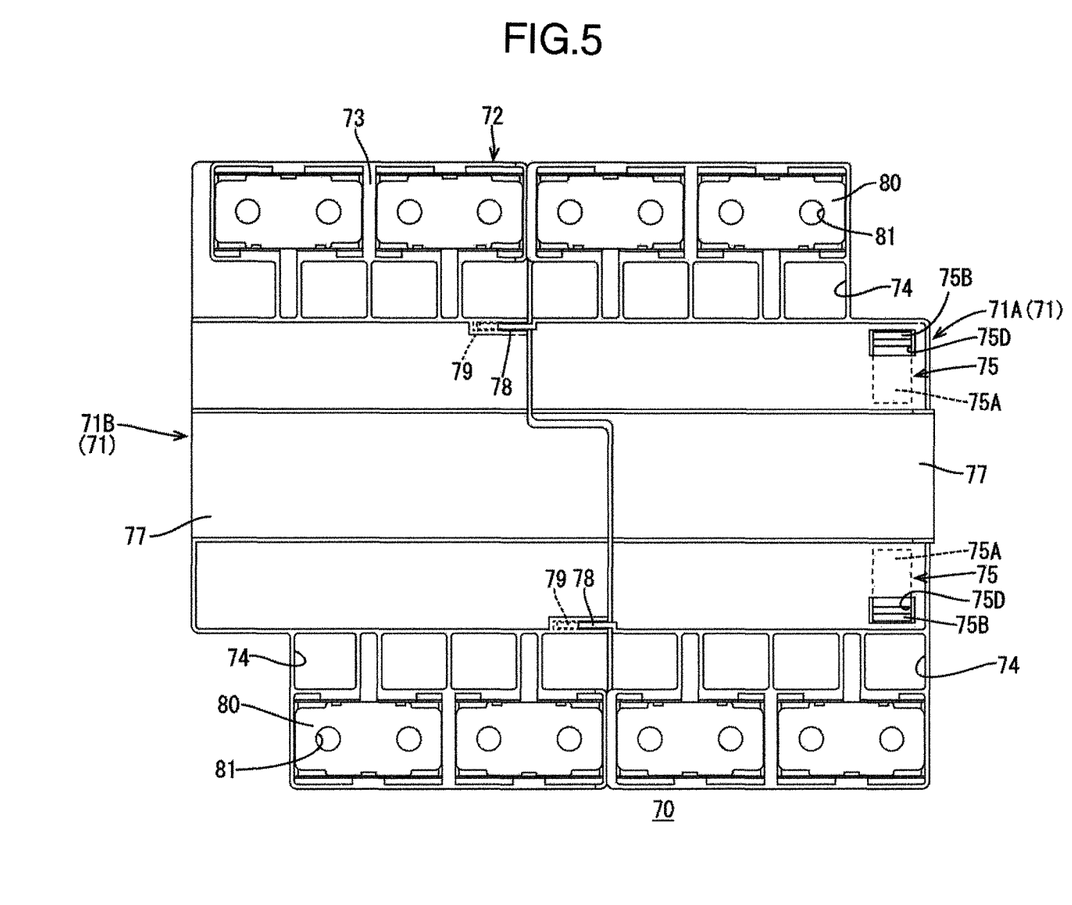
FIG. 5 is a plan view of the busbar holding module.

The busbar holding module 70 is a member attached to a surface of the power storage element group 60, the surface including the electrode mounting surfaces 62 of the power storage elements 61. As shown in FIG. 5, the busbar holding module 70 includes two insulating protectors (71A and 71B), a plurality of busbars 80 that are held by the insulating protectors (71A and 71B) and connect the positive electrode terminals 63A and the negative electrode terminals 63B of adjacent power storage elements 61, voltage detection terminals (not shown) overlapping and electrically connected to the busbars 80, and detection wires (not shown) connected to the voltage detection terminals. In the following description, the insulating protectors (71A and 71B) will be simply referred to as the insulating protectors 71 when there is no need to distinguish between the two protectors.

The busbars 80 are formed by punching a metal plate and, as shown in FIG. 5, have an overall rectangular shape with flat rectangular cut-outs in the four corners. Each busbar 80 is provided with two connection holes 81 through which bolts 82 (see FIG. 1) are coupled to the bolt holes 64 of the corresponding power storage elements 61. The busbars 80 may be made of, for example, copper, a copper alloy, aluminum, an aluminum alloy, and stainless steel (SUS), among other materials.

In this embodiment, two insulating protectors 71 are aligned in the direction in which the power storage elements 61 are also aligned. Each insulating protector 71 is made of an insulating material, such as a synthetic resin, and the like. It should be noted that the number of insulating protectors 71 is not limited to two as in this embodiment. The number of insulating protectors 71, i.e., how many segmented insulating protectors 71 are to be used, may be determined, as necessary, according to the size of the power storage element group 60, i.e., the number of power storage elements 61.

As shown in FIG. 5, each insulating protector 71 includes a plurality (four in this embodiment) of busbar holders 72 that are vertically open and house and hold busbars 80 therein and openings 74 through which the locking pieces 15, 25A, and 25B of the external connection busbar holder 2 can engage with the locking grooves 66 of the corresponding power storage elements 61. The busbar holders 72 are provided at both ends separated in a direction perpendicular to the alignment direction (the direction indicated by the arrow X) of the power storage elements, of each insulating protector 71 to correspond to the electrode terminals 63 of the power storage elements 61. The separated busbar holders 72 are coupled to each other by a coupling portion 77.

Each busbar holder 72 has housing walls 73 formed in the shape of a square tube for holding a busbar 80 therein to insulate the busbar 80 from the adjacent busbar 80. The housing walls 73 also serve as protection walls for adjacent electrode terminals 63. Additionally, the insulating protectors 71 are provided with engaging portions 78 and engaged portions 79 so that adjacent insulating protectors 71 can be coupled to each other.

Figure 6:
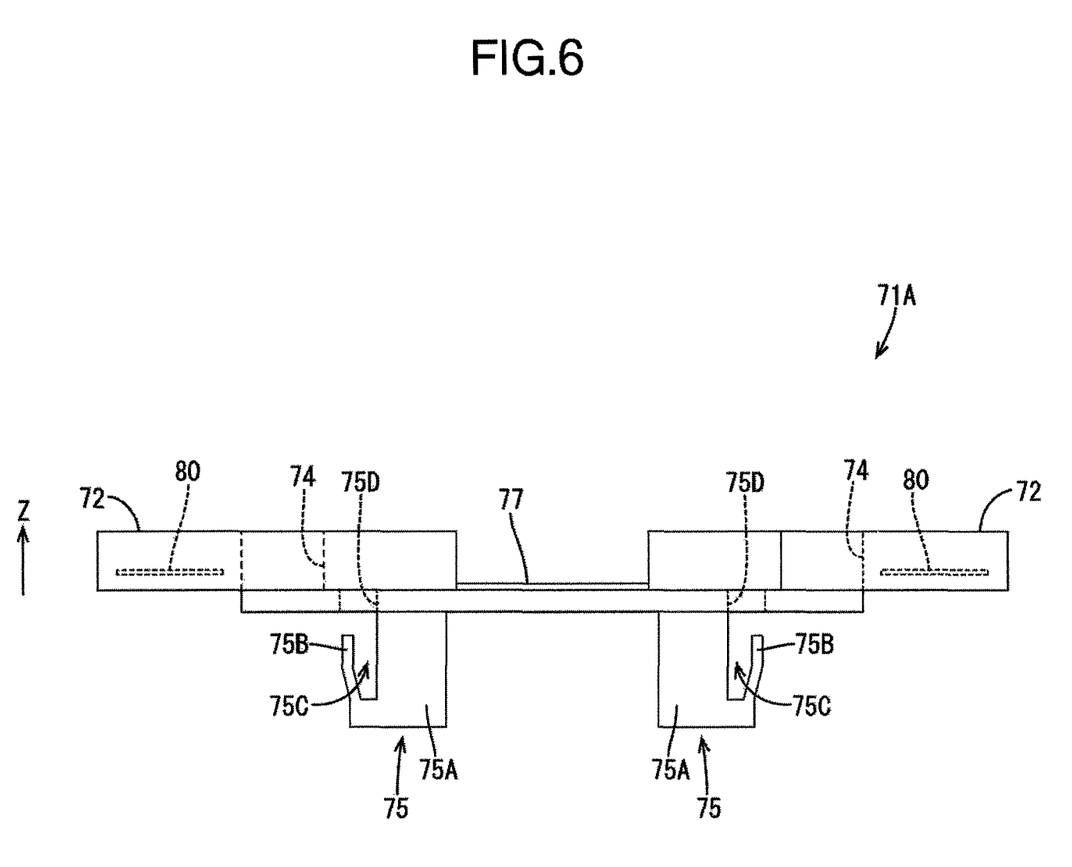
FIG. 6 is a side view of the busbar holding module.

Furthermore, as shown in FIG. 6, a pair of fixing portions 75 are provided at both ends of the coupling portion 77 of the one insulating protector 71A. Each of the fixing portions 75 is joined to one of the fixing grooves 67 formed in a power storage element 61 to fix the external connection busbar holder 2. Accordingly, as shown in FIGS. 1 and 2, the fixing portions 75 are provided at positions of the insulating protector 71A that correspond to the fixing grooves 67 provided in the rightmost power storage element 61 (see FIG. 3). As shown in FIGS. 5 and 6, each of the fixing portions 75 includes a main body 75A, a fixing-reinforcement portion 75B, a fitting portion (fitting groove) 75C, and an opening 75D. It should be noted that the shape and/or structure of the fixing portion 75 is not limited to that described above.

In response to engaging with a later-described engaging portion (protrusion) 26 of the external connection busbar holder 2, the fixing-reinforcement portion 75B deforms and fills the clearance 68 defined between the fixing portion 75 and the fixing groove 67 (see FIG. 2). As shown in FIG. 6, a fixing-reinforcement portion is formed as a projecting portion 75B that projects upward from the bottom of the main body 75A and forms the fitting portion 75C. The projecting portion 75B is made of an insulating material capable of elastic deformation, such as a synthetic resin, and the like, so as to elastically deform upon the corresponding protrusion 26 of the external connection busbar holder 2 engaging with the fitting portion 75C. It should be noted that the structure of the fixing-reinforcement portion is not limited to that of the projecting portion 75B. Essentially, the fixing-reinforcement portion may have any structure as long as it is capable of displacement to fill the clearance 68 between the fixing portion 75 and the fixed portion (fixing groove) 67 in response to engagement with the engaging portion (protrusion) 26. As used herein, the term "displacement" encompasses deformation, change, and movement. As such, a fixing-reinforcement portion may also be configured to move to fill the clearance 68 in response to engaging with the engaging portion (protrusion) 26.

As described above, in this embodiment, a fitting portion is formed as the fitting groove 75C provided between the main body 75A and the projecting portion 75B. In this embodiment, the projecting portion 75B has a thin plate-like shape and is formed with the width of the fitting groove 75C expanding upward (in the direction indicated by the arrow Z) as seen in a side view (see FIG. 6). It should be noted that the shape of the projecting portion 75B is not limited to that shown in FIG. 6. Likewise, the structure of the fitting portion is not limited to that of the fitting groove 75C. That is, the shape and structure of each fixing portion 75 are not limited to those shown in FIG. 6 for the purpose of the present invention.

As shown in FIG. 2, the protrusions 26 of the external connection busbar holder 2 are fitted into the fitting portions (fitting grooves) 75C through the openings 75D. At this time, the projecting portions 75B deform and press against the walls of the fixing grooves 67, thereby filling the clearances 68 between the fixing portions 75 and the fixing grooves 67. This reinforces the joining of the fixing portions 75 and the fixing grooves 67, which in turn reinforces the joining of the insulating protector 71A and the power storage elements 61. At this time, the joining of the external connection busbar holder 2 and the insulating protector 71A is also reinforced.

2-2. Structure of External Connection Busbar Holder

Figure 7:
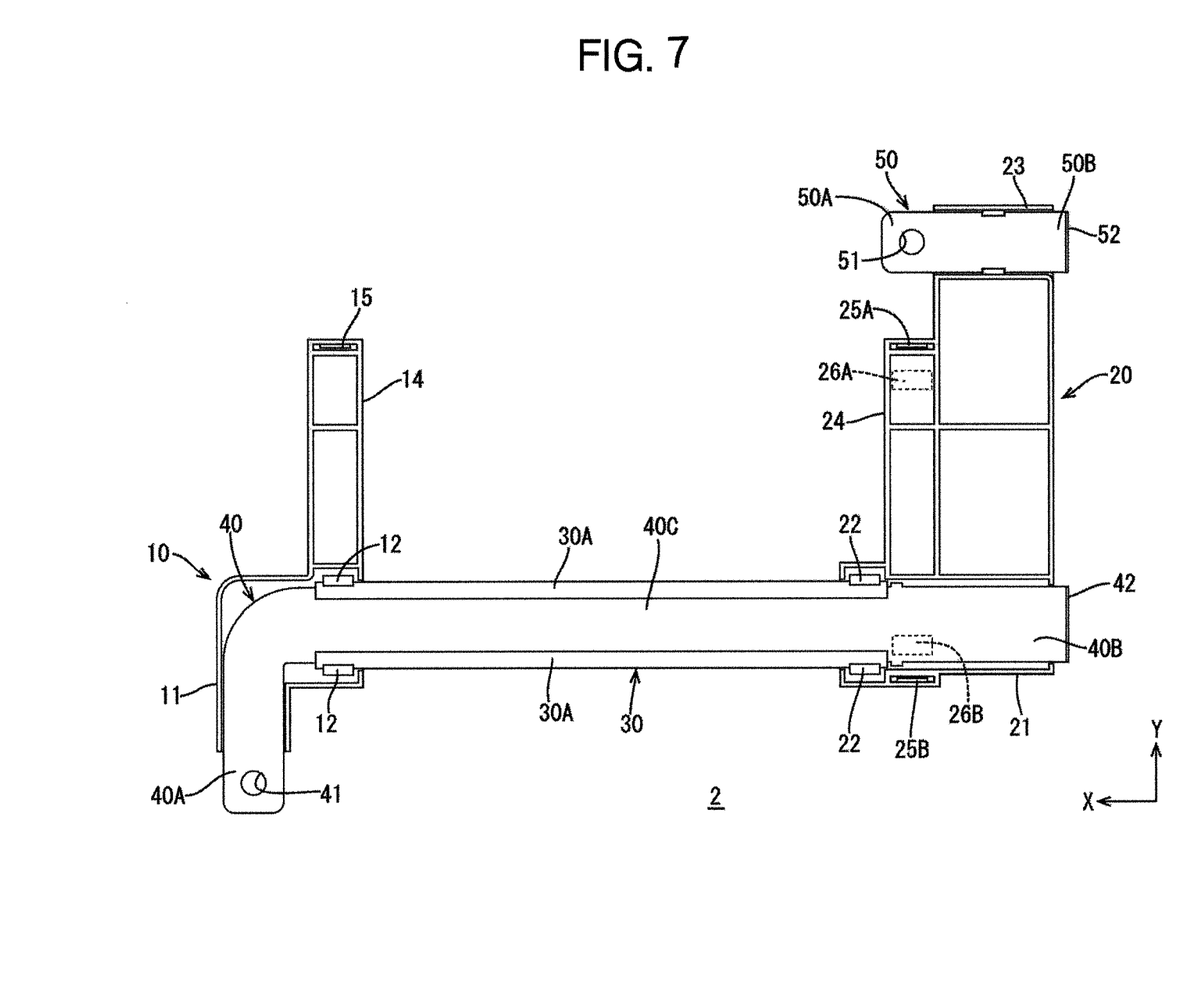
FIG. 7 is a plan view of the external connection busbar holder.

As shown in FIG. 7, the external connection busbar holder 2 includes a negative external connection busbar 40 and a positive external connection busbar 50. In addition, the external connection busbar holder 2 includes a first protector portion 10, a second protector portion 20, and an intermediate protector portion 30, which are formed as separate members. The first protector portion 10 and the second protector portion 20 are coupled and integrated by the intermediate protector portion 30.

The negative external connection busbar 40 is connected to the negative output terminal OUTN of the pair of output electrode terminals (OUTN and OUTP) for external power supply, of the power storage element group 60 (see FIG. 1).

The negative external connection busbar 40 is formed in a thin, elongated plate-like shape extending in the direction in which the power storage elements 61 are aligned (the direction indicated by the arrow X in FIG. 7). More specifically, as also shown in FIG. 7, the negative external connection busbar 40 includes a first electrode connector 40A that is connected to the negative output terminal OUTN, a first external connector 40B that is connected to an external device to which the power storage element group 60 supplies power, and an intermediate portion 40C located between the first electrode connector 40A and the first external connector 40B. As also shown in FIG. 7, the intermediate portion 40C is formed in a shape extending from the first electrode connector 40A to the first external connector 40B.

The first electrode connector 40A has a through hole 41 formed therein to connect the negative external connection busbar 40 to the negative output terminal OUTN. Additionally, the first external connector 40B has a first connection terminal 42 that is vertically bent to connect the negative external connection busbar 40 to an external device connection busbar 92 (an example of an external connection member). The first connection terminal 42 has a through hole 42A formed therein for connection to the external device connection busbar 92 (see FIG. 8).

Figure 9:
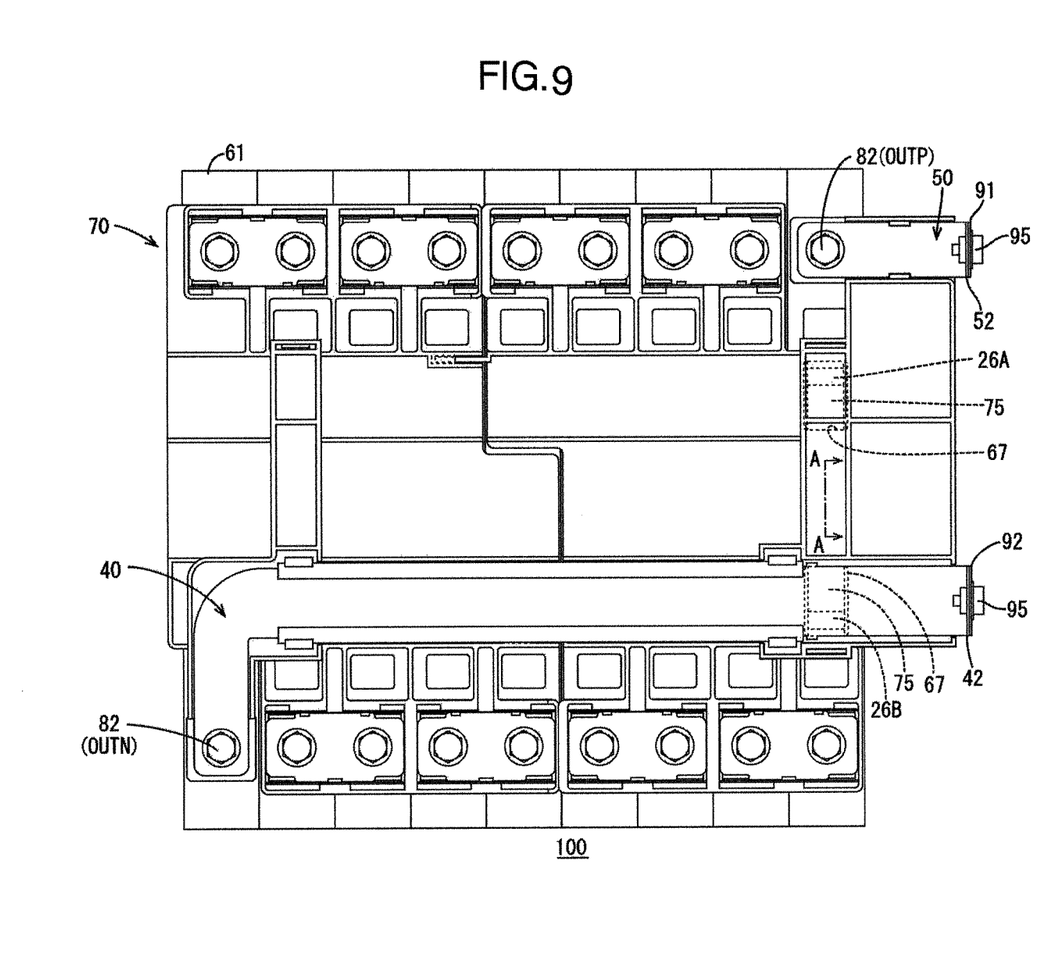
FIG. 9 is a plan view showing external device connection busbars bolted to the power storage module.

Referring to FIG. 7, the negative external connection busbar 40 is formed in a shape extending in the direction in which the power storage elements are aligned (the direction indicated by the arrow X), with one end thereof, i.e., the first electrode connector 40A, connected to the negative output terminal OUTN (the first output electrode terminal) and the other end thereof, i.e., the first external connector 40B (more specifically, the first connection terminal 42 of the first external connector 40B) bolted to the external device connection busbar 92 (see FIG. 9). It should be noted that the negative external connection busbar 40 is one example of the first external connection busbar.

As shown in FIG. 7, the positive external connection busbar 50 includes a second electrode connector 50A for connection to the positive output terminal OUTP and a second external connector 50B for connection to an external device, to which the power storage element group 60 supplies power. The second electrode connector 50A has a through hole 51 formed therein to connect the positive external connection busbar 50 to the positive output terminal OUTP.

Figure 8:
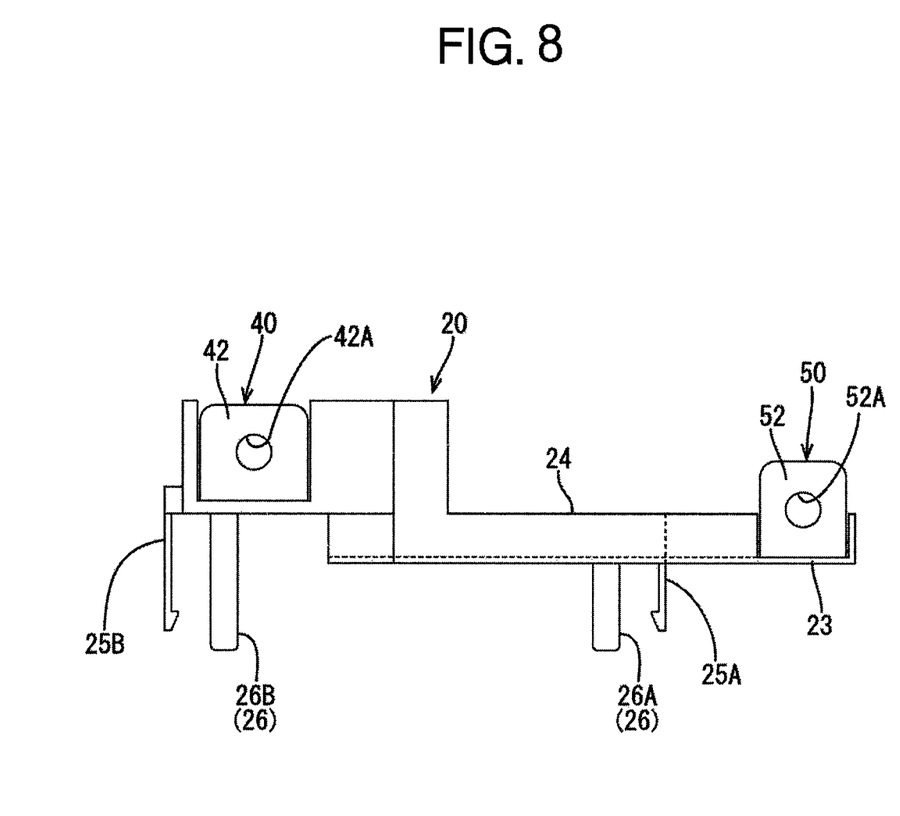
FIG. 8 is a side view of the external connection busbar holder.

As shown in FIG. 8, the second external connector 50B has a second connection terminal 52 vertically bent therefrom to connect the positive external connection busbar 50 to the external device. The second connection terminal 52 has a through hole 52A formed therein for connection to an external device connection busbar 91 (see FIG. 8).

Accordingly, one end of the second external connection busbar 50, i.e., the second electrode connector 50A, is connected to the positive output terminal OUTP (the second output electrode terminal) and the other end thereof, i.e., the second external connector 50B (more specifically, the second connection terminal 52 of the second external connector 50B) is bolted to the external device connection busbar 91 (see FIG. 9). It should be noted that the positive external connection busbar 50 is only one example of the second external connection busbar.

It should be noted that the functions served by the first and second external connection busbars may be reversed; that is, the first external connection busbar may be the positive external connection busbar and the second external connection busbar may be the negative external connection busbar. In other words, depending on the arrangement of the power storage elements 61 in the group 60, the first external connection busbar 40 may serve as the positive external connection busbar while the second external connection busbar 50 may serve as the negative external connection busbar.

The first protector portion 10 is made of an insulating material, such as a synthetic resin, and the like, and as shown in FIG. 7, the first protector portion 10 includes a busbar holder portion 11, first locking portions 12, an elongated portion 14, and the locking piece 15.

The busbar holder portion 11 insulatively holds the first electrode connector 40A that is one end of the negative external connection busbar 40. More specifically, the busbar holder portion 11 also holds a portion of the intermediate portion 40C of the negative external connection busbar 40.

The first locking portions 12, as shown in FIG. 7, are provided as a pair spaced apart by a distance that corresponds to the width of the intermediate protector portion 30, and lock the negative external connection busbar 40 via the intermediate protector portion 30.

The elongated portion 14 extends from the busbar holder portion 11 in the widthwise direction of the intermediate portion 40C of the negative external connection busbar 40, in other words, in a direction perpendicular to the direction in which the power storage elements 61 are arranged. The locking piece 15 is provided at the leading end of the elongated portion 14. The locking piece 15 joins the first protector portion 10, that is, the external connection busbar holder 2, to the power storage element group 60 by engaging with a locking groove 66 (see FIG. 2) formed in an above-described power storage element 61.

Similar to the first protector portion 10, the second protector portion 20 is made of an insulating material, such as a synthetic resin, and the like, and as shown in FIG. 7, the second protector portion 20 includes a first busbar holder portion 21, second locking portions 22, a second busbar holder portion 23, an elongated portion 24, two locking pieces 25A and 25B, and two protrusions (26A and 26B). As shown in FIG. 7, the second protector portion 20 is spaced apart from the first protector portion 10 by a predetermined distance.

The first busbar holder portion 21 insulatively holds the first external connector 40B, which is provided at the second end of the negative external connection busbar 40. More specifically, the first busbar holder portion 21 also holds a portion of the intermediate portion 40C of the negative external connection busbar 40 via the intermediate protector portion 30.

The second locking portions 22, as shown in FIG. 7, are provided as a pair spaced apart by a distance that corresponds to the width of the intermediate protector portion 30, and lock the negative external connection busbar 40 via the intermediate protector portion 30.

The second busbar holder portion 23 holds the positive external connection busbar 50. The elongated portion 24 extends from the first busbar holder portion 21 in the widthwise direction of the intermediate portion 40C of the negative external connection busbar 40 (i.e., in the direction indicated by the arrow Y in FIG. 7) with the locking pieces 25A and 25B provided at two ends of the elongated portion 24. It should be noted that the positions of the locking pieces 25A and 25B are not limited to those indicated in FIG. 7. The locking pieces 25A and 25B join the second protector portion 20, that is, the external connection busbar holder 2, to the power storage element group 60 by engaging with the locking grooves 66 (see FIG. 2) formed in an above-described power storage element 61.

As described above, the second protector portion 20 is spaced apart from the first protector portion 10, holds the other end of the negative external connection busbar (first external connection busbar) 40 on the one end located in the direction perpendicular to the direction in which the power storage elements 61 are aligned (the direction indicated by the arrow X in FIG. 7), and holds the positive external connection busbar (second external connection busbar) 50 at the other end.

The second protector portion 20 also includes a pair of protrusions (one example of engaging portions) (26A and 26B) that engage with the pair of fixing portions 75 of the above described insulating protector 71A, more specifically, are fitted into the fixing grooves 75C of the fixing portions 75 of the above-described insulating protector 71A (see FIG. 2). Note that, in the following description, where there is no need to distinguish between the protrusions 26A and 26B, they are simply referred to as the protrusions 26. Specifically, the protrusions 26 are plate-like and, as shown in FIG. 8, protrude downward from the bottom of the second protector portion 20 (the external connection busbar holder).

The intermediate protector portion 30 is made of an insulating material capable of elastic deformation, such as a synthetic resin, and the like, and is formed through extrusion in this embodiment. The intermediate protector portion 30 holds the intermediate portion 40C of the negative external connection busbar 40 between the first protector portion 10 and the second protector portion 20. At this time, edge portions 30A of the intermediate protector portion 30 hold the negative external connection busbar 40 by covering a portion of the top surface of the negative external connection busbar 40. One end of the intermediate protector portion 30 is held to the first protector portion 10 by the first locking portions 12 while the other end of the intermediate protector portion 30 is held to the second protector portion 20 by the second locking portions 22.

As described above, the first protector portion 10, the second protector portion 20, and the intermediate protector portion 30 are provided as separate members. This makes it possible to allow for power storage element groups with different numbers of power storage elements simply by changing the length of the intermediate protector portion 30, without changing the design of the first protector portion 10 and the second protector portion 20. It should be noted that the configuration of the protector portion of the external connection busbar holder 2 is not limited to that described above. For example, the protector portions (10, 20, and 30) may be provided as a single integrated protector instead of separate members as in this embodiment.

3. Assembly of Power Storage Module

To assemble the power storage module 100 of the above-described embodiment, first, the two insulating protectors (71A and 71B) are coupled to each other using the engaging portions 78 and engaged portions 79. Next, the busbars 80 are housed in the busbar holders 72 of the insulating protectors 71.

The busbar holding module 70 thus assembled is then mounted onto the electrode mounting surface 62 of the power storage element group 60. At this time, the pair of fixing portions 75 of the insulating protector 71A are fitted into the respective pair of fixing grooves 67 provided in the electrode mounting surface 62 of the rightmost power storage element 61. Subsequently, bolts 82 are coupled to the bolt holes 64 of the power storage elements 61 via the connection holes 81 of the busbars 80. This connects the positive electrode terminal 63A and the negative electrode terminal 63B of adjacent power storage elements 61 while attaching the busbar holding module 70 to the power storage element group 60.

Next, the external connection busbar holder 2, with the negative external connection busbar 40 and the positive external connection busbar 50 attached thereto, is mounted to the power storage element group 60 from above the busbar holding module 70. At this time, the locking pieces 15, 25A, and 25B of the external connection busbar holder 2 are brought into engagement with the locking grooves 66 in the power storage elements 61 via the openings 74 of the busbar module 70. At this time, the pair of protrusions 26 on the second protector portion 20 of the external connection busbar holder 2 are fitted into the fitting grooves 75C of the fixing portions 75 via the openings 75D of the fixing portions 75 provided on the insulating protector 71A. Thus the second protector portion 20 is engaged with the insulating protector 71A.

That is to say, the external connection busbar holder 2 is engaged with the busbar holding module 70 as well as being fixed to the power storage element group 60. At this time, the projecting portions 75B deform and press against the walls of the fixing grooves 67, thereby filling the clearances 68 between the fixing portions 75 and the fixing grooves 67 (see FIG. 10). That is to say, the clearances 68, provided to absorb product variations, facilitate the insertion of the fixing portions 75 into the fixing grooves 67, and the fixing of the external connection busbar holder 2 to the power storage element group 60 is reinforced due to the clearances 68 being closed off by the protrusions 26 and the projecting portions 75B. It should be noted that the intermediate protector portion 30 is attached to the intermediate portion 40C of the negative external connection busbar 40 before the negative external connection busbar 40 is attached to the external connection busbar holder 2.

Additionally, a bolt 82 is coupled to the bolt hole 64 of the negative output terminal OUTN of the power storage element group 60 via the through hole 41 of the negative external connection busbar 40, and another bolt 82 is coupled to the bolt hole 64 of the positive output terminal OUTP of the power storage element group 60 via the through hole 51 of the positive external connection busbar 50. Thus, the external connection busbar holder 2 is attached to the power storage element group 60 from above the busbar holding module 70. This completes the assembly of the power storage module 100 as shown in FIG. 1.

Furthermore, in the power storage module 100, as shown in FIGS. 9 and 10, the external device connection busbar 92 is secured to the first connection terminal 42 with a bolt 95 and the external device connection busbar 91 is secured to the second connection terminal 52 with another bolt 95 (see FIG. 10). The torque generated by the bolt at this time is suppressed from affecting the first electrode connector 40A of the elongated first external connection busbar 40 and the second electrode connector 50A of the second external connection busbar 50 as a result of the fixing of the external connection busbar holder 2 to the power storage element group 60 being reinforced.

4. Effect of the Embodiment

According to the foregoing embodiment, in which the external device connection busbars (external connection members) 91 and 92 are bolted to the other ends of the first and second external connection busbars 40 and 50 held by the second protector portion 20, each of the fixing portions 75 provided on the insulating protector 71A include a projecting portion (fixing-reinforcement portion) 75B. In response to the engagement of the pair of protrusions (engaging portions) 26 provided on the external connection busbar holder 2, more specifically provided on the second protector portion 20 of the external connection busbar holder 2, each projecting portion 75B is deformed to fill the clearance 68 defined between the fixing portion 75 and the fixing groove (fixed portion) 67. As a result, the second protector portion 20 is fixed to the power storage elements 61 via the insulating protector 71A.

Accordingly, even if a torque load is generated as the external device connection busbars 91 and 92 are bolted to the other ends of the first and second external connection busbars 40 and 50, the external connection busbar holder 2 is suppressed from moving due to a rotational force caused by the torque load, the movement being allowed by the clearance 68 between the fixing portion 75 and the fixing groove 67. Specifically, movement (rattling) of the external connection busbar holder 2 in the width direction thereof (the direction indicated by the arrow Y in FIG. 10) is suppressed. Thus the torque load is suppressed from affecting the first electrode connector 40A of the elongated first external connection busbar 40 and the second electrode connector 50A of the second external connection busbar 50 via the external connection busbar holder 2. This in turn maintains the reliability of the connection between the first external connection busbar 40, connected to an external connection member with a bolt, and the negative output terminal (output electrode terminal) OUTN (63B), and the connection between the second external connection busbar 50 and the positive output terminal (output electrode terminal) OUTP (63A).

More specifically, the torque load generated by rotating the bolts 95 (see FIG. 10) exerts a rotational force on the first busbar holder portion 21 and the second busbar holder portion 23 of the second protector portion 20. Accordingly, without the fixing portions 75 and the engaging portions (protrusions) 26, the rotational force is likely to make the first busbar holder portion 21 and the second busbar holder portion 23 rattle in the direction indicated by the arrow Y shown in FIG. 10 (displacement in the direction indicated by the arrow Y). If the second protector portion 20 is displaced in the direction indicated by the arrow Y, that translates to a force being exerted on the positive external connection busbar 50 and the negative external connection busbar 40 in the direction indicated by the arrow Y. Subsequently, that force is applied to the second electrode connector 50A between the positive external connection busbar 50 and the positive output terminal OUTP (63A) and to the first electrode connector 40A between the negative external connection busbar 40 and the negative output terminal OUTN (63B). As the positive external connection busbar 50 is shorter than the negative external connection busbar 40, a larger force is exerted on the second electrode connector 50A of the positive external connection busbar 50 than on the first electrode connector 40A. Thus, there is concern that this will affect the reliability of the second electrode connector 50A.

However, according to this embodiment, the pair of fixing portions 75 and the pair of protrusions 26 reinforce the fixing of the external connection busbar holder 2 to the power storage element group 60. Thus, due to movement of the first busbar holder portion 21 and the second busbar holder portion 23 being suppressed, the force generated from bolting is suppressed from being applied to the first electrode connector 40A between the negative external connection busbar 40 and the negative output terminal OUTN (63B) and to the second electrode connector 50A between the positive external connection busbar 50 and the positive output terminal OUTP (63A).

Other Embodiments

The technical matter disclosed herein is not limited to the embodiment described in connection with the foregoing description and attached drawings. For example, the following embodiments also fall under the technical scope of the present invention.

(1) Although the foregoing embodiment is shown employing a configuration in which the fixed portions joined to the fixing portions 75 of the insulating protector 71A are provided in the form of the fixing grooves 67 in one of the power storage elements 61, the invention is not limited to this. For example, the fixed portions may also be provided in another member fixed to the power storage element group 60, such as a battery cover fixed to the power storage element group 60.

(2) In the foregoing embodiment, the external connection busbar holder 2 includes the first protector portion 10, the second protector portion 20, and the intermediate protector portion 30, and two engaging portions (protrusions) 26 are provided on the second protector portion 20. The present invention, however, is not limited to this. For example, an additional protrusion 26 may also be provided on the elongated portion 14 of the first protector portion 10 and, accordingly, an additional fixing portion 75 that corresponds to the additional protrusion 26 may be provided on the insulating protector 71B. Alternatively, one protrusion 26 may also be provided on each of the first protector portion 10 and the second protector portion 20, or three such protrusions may also be provided on the second protector portion 20.

Moreover, the external connection busbar holder 2 may be provided as a single integrated protector rather than the first and second protector portions (10 and 20) being separated by the intermediate protector portion 30. As another alternative, the portion of the external connection busbar holder 2 that corresponds to the intermediate protector portion 30 may be incorporated into the first or second protector portion 10 or 20 so that the external connection busbar holder 2 is composed of the first protector portion 10 and the second protector portion 20. Moreover, the second protector portion may be divided into two, so that the external connection busbar holder 2 includes a total of four protector portions.

(3) In the foregoing embodiment, bolts 82 are used to connect: the busbars 80 to the electrode terminals 63 of the power storage elements 61; the negative external connection busbar 40 to the negative output terminal OUTN (63B); and the positive external connection busbar 50 to the positive output terminal OUTP (63A). However, the present invention is not limited to this. The connection can be made through laser welding, for example. In that case, the through holes to which bolts are coupled will be omitted. Even in this case, the reliability of the connection between the elongated external connection busbar and an output electrode terminal of the power storage elements is maintained.

The external connection busbars may not necessarily be directly connected to the output terminals. Rather, they may be indirectly connected to each other via intervening conductive members, such as sub-busbars. Essentially, any suitable type of connection will suffice as long as electric connection is established between the external connection busbars and the output terminals.

(4) In the foregoing embodiment, an example was described in which the negative external connection busbar (first external connection busbar) 40 has an elongated shape extending in the direction in which the power storage elements 61 are aligned. However, the present invention is not limited to this. For example, the negative external connection busbar may have a shape extending perpendicular to the direction in which the power storage elements 61 are aligned (i.e., in the direction indicated by the arrow X).

LIST OF REFERENCE NUMERALS

1: Connection Module
2: External Connection Busbar Holder
10: First Protector Portion
20: Second Protector Portion
26: Protrusion (Engaging Portion)
30: Intermediate Protector Portion
40: Negative External Connection Busbar (First External Connection Busbar)
50: Positive External Connection Busbar (Second External Connection Busbar)
60: Power Storage Element Group
61: Power Storage Element
63: Electrode Terminal
63A: Positive Electrode Terminal
63B: Negative Electrode Terminal
67: Fixing Groove (Fixed Portion)
68: Clearance
70: Busbar Holding Module
71, 71A, 71B: Insulating Protector
75: Fixing Portion
75A: Main Body of Fixing Portion
75B: Projecting Portion (Fixing-Reinforcement Portion)
75C: Fitting Groove (Fitting Portion)
91, 92: External Device Connection Busbar (External Connection Member)
OUTN: Negative Output Terminal (First Output Electrode Terminal)
OUTP: Positive Output Terminal (Second Output Electrode Terminal)

What is claimed is:

1. A connection module to be mounted on a group of power storage elements each having positive and negative electrode terminals, the group of power storage elements including a first output electrode terminal for outputting electrical power of one polarity and a second output electrode terminal for outputting electrical power of the other polarity, the connection module, comprising:
a busbar holding module including a plurality of busbars that each connect the positive electrode terminal and the negative electrode terminal of adjacent power storage elements and insulating protectors that hold the plurality of busbars; and
an external connection busbar holder disposed above the busbar holding module;
wherein the insulating protectors include fixing portions joined to fixed portions provided in the power storage elements or another member fixed to the power storage elements, so as to fix the external connection busbar holder, wherein the external connection busbar holder includes:
a first external connection busbar having one end and another end, the one end being electrically connected to the first output electrode terminal and an external connection member being bolted to the other end;
a second external connection busbar having one end and another end, the one end being electrically connected to the second output electrode terminal and an external connection member being bolted to the other end; and
engaging portions that engage with the fixing portions,
wherein each of the fixing portions includes a fixing-reinforcement portion that is displaced to fill a clearance between the fixing portion and the fixed portion in response to engagement with the engaging portion; and wherein each of the engaging portions is formed by a protrusion extending downward from a bottom of the external connection busbar holder.

2. The connection module according to claim 1,
wherein [each of the engaging portions is formed by a protrusion extending downward from a bottom of the external connection busbar holder,] each of the fixing portions includes a main body and a fitting portion into which one of the protrusions fits, and
each of the fixing-reinforcement portions is formed by a projecting portion that projects upward from a bottom of the main body to form the fitting portion.

3. The connection module according to claim 1,
wherein each of the fitting portions is formed by a fitting groove provided between the main body of the fixing portion and the projecting portion,
each of the protrusions has a plate-like shape that fits into one of the fitting grooves, and
each of the projecting portions has a thin plate-like shape and is formed upwardly expanding the width of the fitting groove as seen in a side view.

4. The connection module according to claim 1,
wherein the external connection busbar holder includes:
a first protector portion that holds the one end of the first external connection busbar, and
a second protector portion that holds the other end of the first external connection busbar on one end thereof located in a direction perpendicular to a direction in which the power storage elements are aligned, the second protector portion further holding the second external connection busbar on the other end thereof located in the perpendicular direction, and
the engaging portions are provided in the second protector portion.

5. The connection module according to claim 3,
wherein the external connection busbar holder includes an intermediate protector portion that holds the first external connection busbar,
the first protector portion, the second protector portion, and the intermediate protector portion are separate members, and
the external connection busbar holder is integrated by joining the first protector portion and the second protector portion with the intermediate protector portion.

* * * * *